United States Patent
He et al.

(10) Patent No.: US 11,405,238 B2
(45) Date of Patent: Aug. 2, 2022

(54) CONTROLLING DEVICE AND METHOD IMPLEMENTED THEREON FOR ETHERNET VIRTUAL PRIVATE NETWOK

(71) Applicant: Telefonaktiebolaget LM Ericsson (publ), Stockholm (SE)

(72) Inventors: Jiang He, Beijing (CN); Xianmin Li, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/759,612

(22) PCT Filed: Jan. 2, 2018

(86) PCT No.: PCT/CN2018/070017
§ 371 (c)(1),
(2) Date: Apr. 27, 2020

(87) PCT Pub. No.: WO2019/134067
PCT Pub. Date: Jul. 11, 2019

(65) Prior Publication Data
US 2020/0336334 A1 Oct. 22, 2020

(51) Int. Cl.
*G06F 15/16* (2006.01)
*H04L 12/46* (2006.01)
(Continued)

(52) U.S. Cl.
CPC ...... *H04L 12/4641* (2013.01); *H04L 12/4633* (2013.01); *H04L 41/0816* (2013.01);
(Continued)

(58) Field of Classification Search
CPC ............ H04L 12/4641; H04L 12/4633; H04L 41/0816; H04L 41/0886; H04L 45/20;
(Continued)

(56) References Cited

U.S. PATENT DOCUMENTS

| | | | |
|---|---|---|---|
| 9,794,180 B2 | 10/2017 | Thoria et al. | |
| 2016/0119156 A1* | 4/2016 | Drake | H04L 45/16 709/223 |

(Continued)

FOREIGN PATENT DOCUMENTS

| | | |
|---|---|---|
| CN | 104253759 A | 12/2014 |
| EP | 2991284 A1 | 3/2016 |

(Continued)

OTHER PUBLICATIONS

OpenFlow enabled Integrated Routing and Bridging over Ethernet Virtual Private Networks Panagiotis Karamichailidis;Kostas Choumas;Thanasis Korakis NOMS 2020—2020 IEEE/IFIP Network Operations and Management Symposium (Year: 2020).*

(Continued)

*Primary Examiner* — Oscar A Louie
*Assistant Examiner* — Oluwatosin M Gidado
(74) *Attorney, Agent, or Firm* — Christopher & Weisberg, P.A.

(57) ABSTRACT

A controlling device is disclosed for Ethernet virtual private network (EVPN). According to an embodiment, the controlling device determines a first provider (P) device which is to handle broadcast, unknown unicast or multicast (BUM) traffic from a first provider edge (PE) device in an EVPN instance, on behalf of remaining PE devices in the same EVPN instance. The controlling device performs route reflection from the remaining PE devices to the first PE device such that the first PE device knows that BUM traffic needs to be forwarded to the first P device. The controlling device configures the first P device such that upon receipt of BUM traffic from the first PE device, the first P device can forward the BUM traffic to the remaining PE devices.

19 Claims, 8 Drawing Sheets

(51) Int. Cl.
*H04L 41/0816* (2022.01)
*H04L 41/08* (2022.01)
*H04L 45/00* (2022.01)
*H04L 45/302* (2022.01)
*H04L 45/42* (2022.01)
*H04L 45/50* (2022.01)
*H04L 47/125* (2022.01)

(52) U.S. Cl.
CPC .......... *H04L 41/0886* (2013.01); *H04L 45/20* (2013.01); *H04L 45/3065* (2013.01); *H04L 45/42* (2013.01); *H04L 45/50* (2013.01); *H04L 47/125* (2013.01)

(58) Field of Classification Search
CPC ..... H04L 45/3065; H04L 45/42; H04L 45/50; H04L 47/125
USPC ........................................................ 709/223
See application file for complete search history.

(56) References Cited

U.S. PATENT DOCUMENTS

| | | | |
|---|---|---|---|
| 2016/0134525 A1* | 5/2016 | Zhang | H04L 69/325 370/392 |
| 2017/0141963 A1 | 5/2017 | Chalapathy et al. | |
| 2017/0250904 A1 | 8/2017 | Singarayan et al. | |
| 2017/0288948 A1* | 10/2017 | Singh | H04L 45/50 |
| 2017/0373973 A1* | 12/2017 | Bickhart | H04L 45/50 |
| 2018/0375763 A1* | 12/2018 | Brissette | H04L 49/35 |
| 2020/0014557 A1* | 1/2020 | Wang | H04L 12/4641 |

FOREIGN PATENT DOCUMENTS

| | | | | |
|---|---|---|---|---|
| EP | 3151510 A2 * | 4/2017 | | H04L 45/66 |
| EP | 3188422 A1 * | 7/2017 | | H04L 12/462 |

OTHER PUBLICATIONS

SDN enhanced ethernet VPN for data center interconnect Kyoomars Alizadeh Noghani;Andreas Kassier 2017 IEEE 6th International Conference on Cloud Networking (CloudNet) Year: 2017 | Conference Paper | Publisher: IEEE (Year: 2017).*

VXLAN and EVPN for data center network transformation Talvinder Singh;Varun Jain;G Satish Babu 2017 8th International Conference on Computing, Communication and Networking Technologies (ICCCNT) Year: 2017 | Conference Paper | Publisher: IEEE (Year: 2017).*

Sajassi, A., et al., "BGP MPLS-Based Ethernet VPN", Internet Engineering Task Force (IETF); Request for Comments: 7432 Category: Standards Track; ISSN: 2070-1721, Feb. 2015, pp. 1-56.

Noghani, Kyoomars Alizadeh, et al., "SDN Enhanced Ethernet VPN for Data Center Interconnect", 2017 IEEE 6th International Conference on Cloud Networking, Sep. 25, 2017, pp. 1-6.

Zhang, Z., et al., "Updates on EVPN BUM Procedures draft-zzhang-bess-evpn-bum-procedure-updates-01", BESS, Internet-Draft, Updates: 7432 (if approved), Intended status: Standards Track, Dec. 18, 2015, pp. 1-20.

* cited by examiner

CONTROLLING DEVICE AND METHOD IMPLEMENTED THEREON FOR ETHERNET VIRTUAL PRIVATE NETWOK

TECHNICAL FIELD

Embodiments of the disclosure generally relate to network communication, and, more particularly, to a controlling device and a provider (P) device as well as methods implemented thereon for Ethernet virtual private network (EVPN).

BACKGROUND

This section introduces aspects that may facilitate better understanding of the present disclosure. Accordingly, the statements of this section are to be read in this light and are not to be understood as admissions about what is in the prior art or what is not in the prior art.

With the development of technologies for data center deployments, there have emerged a new set of requirements, such as multihoming and redundancy, multicast optimization, provisioning simplicity, flow-based load balancing, and multipathing. These requirements are difficult to fulfill for current layer-2 VPN (L2VPN) solutions such as virtual private local area network (LAN) service (VPLS). To meet these requirements, the Internet engineering task force (IETF) has proposed, in request for comments (RFC) 7432, a new VPN solution called Ethernet VPN (EVPN). It is a border gateway protocol (BGP) multi-protocol label switching (MPLS)-based solution.

In a particular EVPN instance, a provider edge (PE) device uses a provider tunnel (P-tunnel) to send broadcast, unknown unicast or multicast (BUM) traffic to other PE devices. The P-tunnel could be implemented by ingress replication or point to multipoint (P2MP) tunnels. For ingress replication, a given BUM packet is sent from a single ingress PE device to other PE devices. For P2MP tunnels, the transport technology could be resource reservation protocol-traffic engineering (RSVP-TE) or multicast label distribution protocol (mLDP) to create a multicast tree.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved forwarding solution for EVPN.

According to one aspect of the disclosure, there is provided a method implemented at a controlling device in an EVPN. The method comprises determining a first provider (P) device which is to handle BUM traffic from a first PE device in an EVPN instance, on behalf of remaining PE devices in the same EVPN instance. The method further comprises performing route reflection from the remaining PE devices to the first PE device such that the first PE device knows that BUM traffic needs to be forwarded to the first P device. The method further comprises configuring the first P device such that upon receipt of BUM traffic from the first PE device, the first P device can forward the BUM traffic to the remaining PE devices.

In an embodiment of the disclosure, determining the first P device comprises determining a P-tunnel from the first PE device to the remaining PE devices based at least on routes related to BUM traffic handling from the PE devices in the EVPN instance. Determining the first P device further comprises selecting the first P device from the P-tunnel.

In an embodiment of the disclosure, the P-tunnel is determined based further on at least one of: transport topology among the PE devices in the EVPN instance; traffic engineering policy; and traffic engineering status.

In an embodiment of the disclosure, performing the route reflection comprises receiving, from the PE devices in the EVPN instance, routes related to BUM traffic handling. Performing the route reflection further comprises modifying the routes from the remaining PE devices such that upon receipt of the modified routes, the first PE device knows that BUM traffic needs to be forwarded to the first P device. Performing the route reflection further comprises sending the modified routes to the first PE device.

In an embodiment of the disclosure, the route from a remaining PE device is an Inclusive Multicast Ethernet Tag Route. Modifying the route comprises setting Originating Router's IP Address field to an IP address of the controlling device. Modifying the route further comprises setting Next Hop field to an IP address of the first P device. Modifying the route further comprises replacing MPLS Label field in PMSI Tunnel Attribute allocated by the remaining PE device, with a corresponding value allocated by the first P device.

In an embodiment of the disclosure, the P-tunnel between the first PE device and the first P device is implemented through ingress replication, and the EVPN is an MPLS-based VPN. The method further comprises generating Ethernet A-D per Ethernet Segment Routes including Ethernet segment identifiers (ESIs) of the remaining PE devices. The method further comprises sending the Ethernet A-D per Ethernet Segment Routes to the first PE device.

In an embodiment of the disclosure, the method further comprises at least one of: configuring a same MPLS Label field in PMSI Tunnel Attribute for a same EVPN instance on the PE devices; and configuring a same ESI label for a same ESI on the PE devices.

In an embodiment of the disclosure, configuring the first P device comprises generating a first forwarding rule that instructs the first P device to, upon receipt of BUM traffic from the first PE device, forward the BUM traffic to the remaining PE devices. Configuring the first P device further comprises sending the first forwarding rule to the first P device.

In an embodiment of the disclosure, the method further comprises selecting a second P device from the P-tunnel. The method further comprises configuring the second P device such that upon receipt of BUM traffic from the first P device, the second P device can forward the BUM traffic to one or more of the remaining PE devices.

In an embodiment of the disclosure, configuring the second P device comprises generating a second forwarding rule that instructs the second P device to, upon receipt of BUM traffic from the first P device, forward the BUM traffic to the one or more of the remaining PE devices. Configuring the second P device further comprises sending the second forwarding rule to the second P device.

In an embodiment of the disclosure, the controlling device is distributed on a first sub-controlling device configured to determine the first P device, and a second sub-controlling device configured to perform the route reflection and configure the first P device.

In an embodiment of the disclosure, the controlling device is distributed on a plurality of sub-controlling devices each of which is connected to part of the PE devices in the EVPN instance. The plurality of sub-controlling devices are configured to work together for the PE devices in the EVPN instance.

According to another aspect of the disclosure, there is provided a method implemented at a provider (P) device in an EVPN. The method comprises receiving configuration information from a controlling device in the EVPN. The configuration information instructs the P device to, upon receipt of BUM traffic from a first PE device in an EVPN instance, forward the BUM traffic to one or more of remaining PE devices in the same EVPN instance. The method further comprises, upon receipt of a packet of BUM traffic from the first PE device, forwarding the packet according to the configuration information.

In an embodiment of the disclosure, forwarding the packet according to the configuration information comprises encapsulating an ESI label into every packet forwarded out.

According to another aspect of the disclosure, there is provided a controlling device in an EVPN. The controlling device comprises a processor and a memory. The memory contains instructions executable by the processor, whereby the controlling device is operative to determine a first provider (P) device which is to handle BUM traffic from a first PE device in an EVPN instance, on behalf of remaining PE devices in the same EVPN instance. The controlling device is further operative to perform route reflection from the remaining PE devices to the first PE device such that the first PE device knows that BUM traffic needs to be forwarded to the first P device. The controlling device is further operative to configure the first P device such that upon receipt of BUM traffic from the first PE device, the first P device can forward the BUM traffic to the remaining PE devices.

In an embodiment of the disclosure, the controlling device is operative to perform the method according to the above aspect.

According to another aspect of the disclosure, there is provided a provider (P) device in an EVPN. The P device comprises a processor and a memory. The memory contains instructions executable by the processor, whereby the P device is operative to receive configuration information from a controlling device in the EVPN. The configuration information instructs the P device to, upon receipt of BUM traffic from a first PE device in an EVPN instance, forward the BUM traffic to one or more of remaining PE devices in the same EVPN instance. The P device is further operative to, upon receipt of a packet of BUM traffic from the first PE device, forward the packet according to the configuration information.

In an embodiment of the disclosure, the P device is operative to forward the packet according to the configuration information by encapsulating an ESI label into every packet forwarded out.

According to another aspect of the disclosure, there is provided a computer program product. The computer program product comprises instructions which when executed by at least one processor, cause the at least one processor to perform the method according to the above aspect.

According to another aspect of the disclosure, there is provided a computer readable storage medium. The computer readable storage medium comprises instructions which when executed by at least one processor, cause the at least one processor to perform the method according to the above aspect.

According to another aspect of the disclosure, there is provided a controlling device in an EVPN. The controlling device comprises a determination module for determining a first provider (P) device which is to handle BUM traffic from a first PE device in an EVPN instance, on behalf of remaining PE devices in the same EVPN instance. The controlling device further comprises a route reflection module for performing route reflection from the remaining PE devices to the first PE device such that the first PE device knows that BUM traffic needs to be forwarded to the first P device. The controlling device further comprises a configuration module for configuring the first P device such that upon receipt of BUM traffic from the first PE device, the first P device can forward the BUM traffic to the remaining PE devices.

According to another aspect of the disclosure, there is provided a provider (P) device in an EVPN. The P device comprises a reception module for receiving configuration information from a controlling device in the EVPN. The configuration information instructs the P device to, upon receipt of BUM traffic from a first PE device in an EVPN instance, forward the BUM traffic to one or more of remaining PE devices in the same EVPN instance. The P device further comprises a forwarding module for, upon receipt of a packet of BUM traffic from the first PE device, forwarding the packet according to the configuration information.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

As mentioned above, the existing flooding mechanisms in EVPN include ingress replication and P2MP tunnels. For ingress replication, the bandwidth efficiency is low since an ingress PE device has to replicate a BUM packet multiple times and send each one of the multiple copies to a corresponding egress PE device.

For P2MP tunnels, mandatory end-to-end multicast support is required for transport infrastructure. However, the support is often not available, which mostly happens on traverse networks. Furthermore, P2MP is complex in operation and has a high maintaining cost. No matter RSVP-TE/mLDP or other multicast protocols are employed, it is a heavy task to establish and maintain a multicast tree. In addition, P2MP has a fixed tree topology since the multicast tree established depends on the multicast protocol used. Thus, it is difficult to tune based on traffic engineering policy at running time.

The present disclosure proposes an improved forwarding solution for EVPN. Hereinafter, the solution will be described in detail with reference to FIGS. 1-11.

Figure 1:
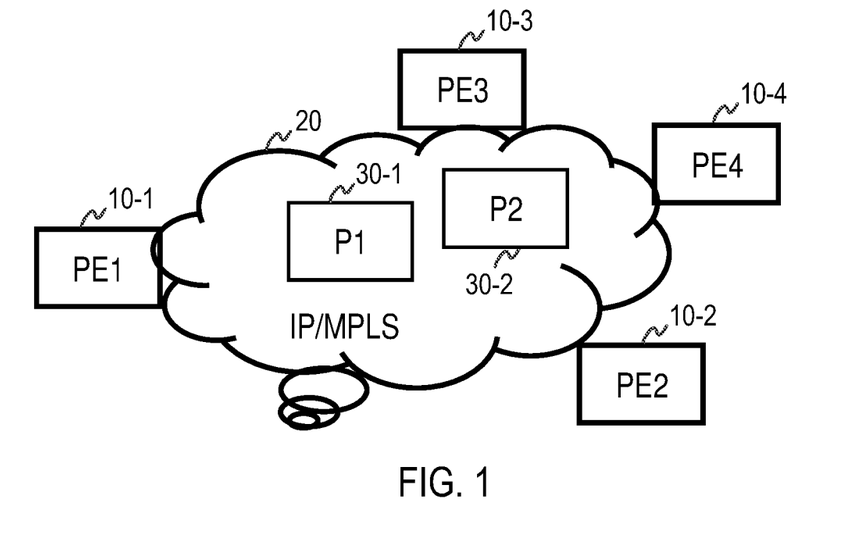
FIG. 1 is a schematic diagram showing a communication system into which an embodiment of the disclosure is applicable.

FIG. 1 is a schematic diagram showing a communication system into which an embodiment of the disclosure is applicable. The communication system may be used to implement an EVPN. As shown, the communication system comprises four provider edge (PE) devices 10-1, 10-2, 10-3 and 10-4 (simply denoted as PE1, PE2, PE3 and PE4), an Internet protocol (IP)/multi-protocol label switching (MPLS) network 20, and two provider (P) devices 30-1 and 30-2 (simply denoted as P1 and P2). Although four PE devices and two P devices are shown in FIG. 1, there may be more or less PE devices or P devices. Note that customer edge (CE) devices are omitted in FIG. 1 for brevity.

The CE device enables a terminal device to connect to the IP/MPLS network 20. The terminal device may be, for example, a mobile phone, a pad computer, a laptop computer, a desktop computer, or any other devices with wired and/or wireless communication capability. The CE device may be, for example, a router, a switch, a gateway, a modem, a firewall, a network interface controller (NIC), a hub, a bridge, or any other type of data transfer device. The PE device 10-1/10-2/10-3/10-4 is an edge node of the IP/MPLS network 20 and functions as an edge device responsible for providing users with EVPN services. The PE device 10-1/10-2/10-3/10-4 may be, for example, a router, a switch, a gateway, a modem, a firewall, an NIC, a hub, a bridge, or any other type of data transfer device.

Each CE device may be either connected to one PE device, or multihomed to two or more PE devices via an Ethernet segment which comprises links between the CE device and each of the two or more PE devices. The Ethernet segment can be identified by an Ethernet segment identifier (ESI). The ESI may be manually configured or automatically derived. Once the ESI for the Ethernet segment is assigned for the CE device, it may be advertised by the two or more PE devices through Ethernet Segment Route defined in RFC 7432 and related protocols. Thus, the two or more PE devices can automatically discover that they are all connected to the same Ethernet segment.

The IP/MPLS network 20 can route and/or forward traffic provided via the EVPN. The IP/MPLS network 20 may be, for example, an IP based network, or an MPLS based network, or a combination thereof. The P device 30-1/30-2 operates inside the IP/MPLS network 20 and does not directly interface to any CE device. The P device 30-1/30-2 may be, for example, a router, a switch, a gateway, a modem, a firewall, an NIC, a hub, a bridge, or any other type of data transfer device.

As an exemplary example, it is assumed that an enterprise has CE devices (for example, application servers) deployed in multiple data centers at different locations to communicate with each other within the same L2VPN. As the data centers are interconnected through transport networks such as IP/MPLS, then, the EVPN may be used to accommodate L2VPN services over the transport networks connecting to these data centers. These CE devices located in different data centers can be considered as belonging to the same EVPN instance. There may be multiple EVPN instances in the data centers.

Figure 2:
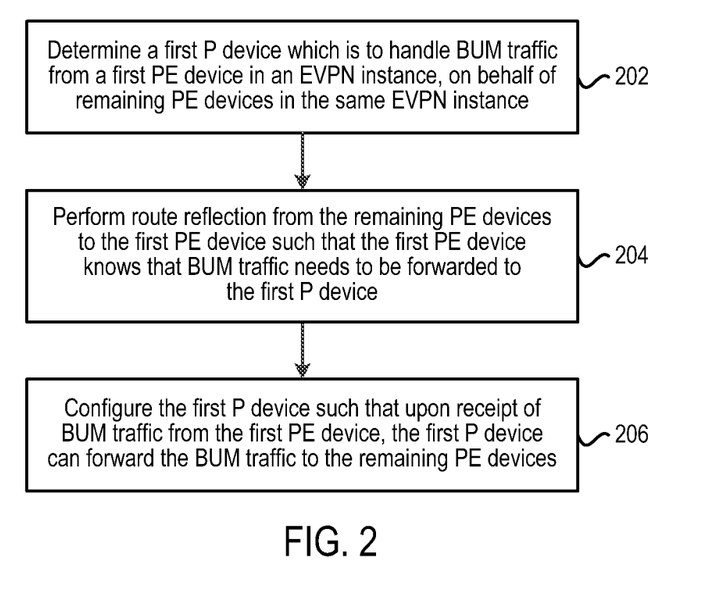
FIG. 2 is a flowchart illustrating a method implemented at a controlling device according to an embodiment of the disclosure.
Figure 5:
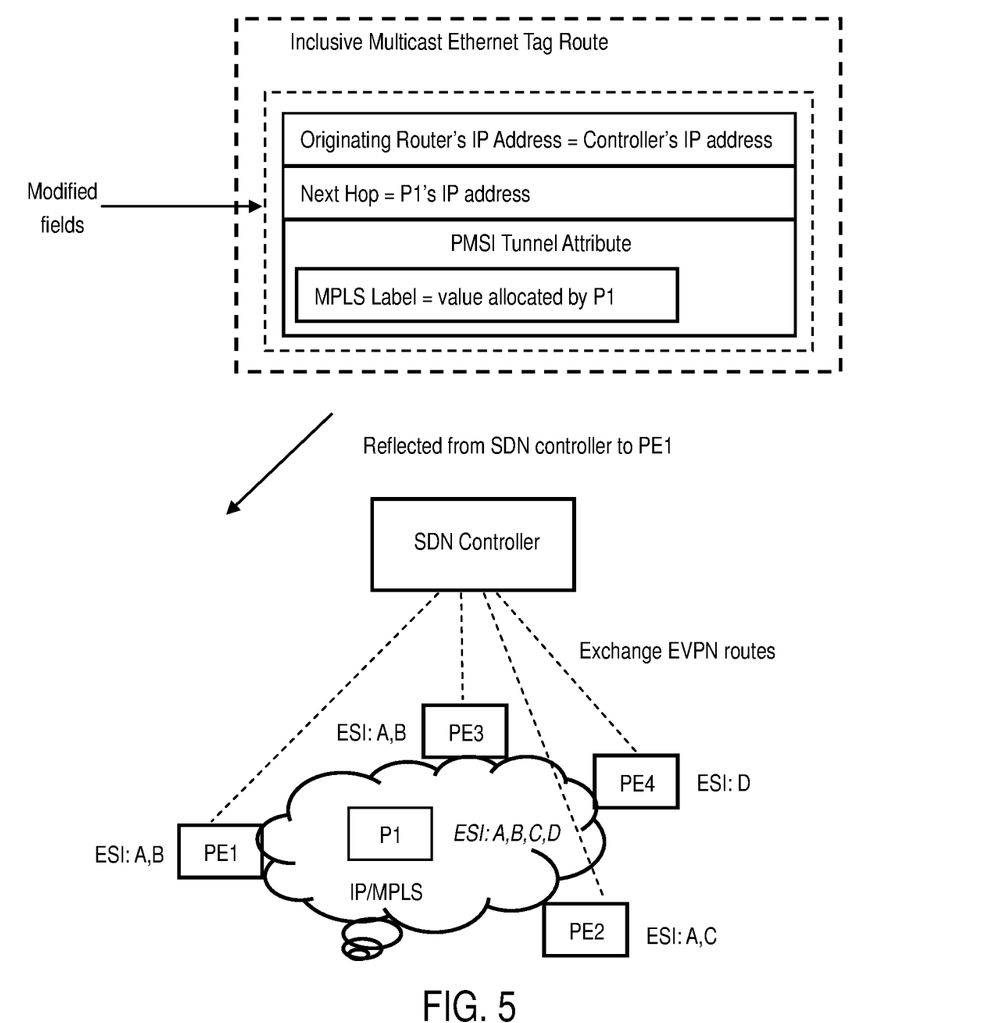
FIG. 5 is a schematic diagram for explaining the process according to an embodiment of the disclosure.
Figure 6:
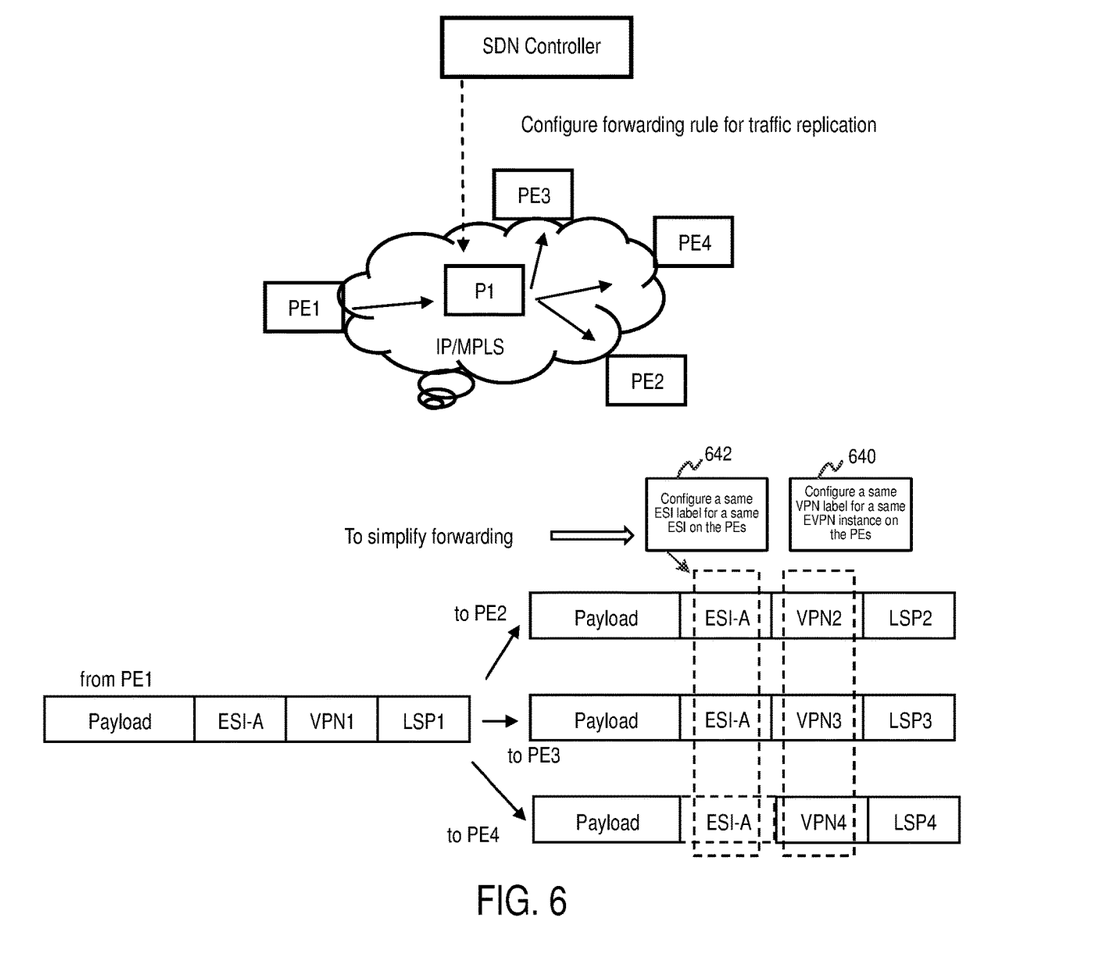
FIG. 6 is a schematic diagram for explaining the process according to an embodiment of the disclosure.

FIG. 2 is a flowchart illustrating a method implemented at a controlling device according to an embodiment of the disclosure. For example, the controlling device may be implemented as a software defined networking (SDN) controller. As shown in FIGS. 5-6 which may facilitate understanding of this method, the controlling device (e.g., SDN controller) may be applied into the environment as shown in FIG. 1. It should be noted that due to some characteristics such as the capabilities of communicating with and controlling various network devices, as well as knowing various configuration information of the corresponding network, the SDN controller is suitable for implementing the controlling device of the present disclosure. However, those skilled in the art will understand that the controlling device may also be implemented in any other suitable ways as long as the steps described below regarding the controlling device can be performed.

At step 202, the controlling device determines a first P device which is to handle BUM traffic from a first PE device in an EVPN instance, on behalf of remaining PE devices in the same EVPN instance. The first PE device may be any one of the PE devices in the same EVPN instance. In the exemplary example shown in FIGS. 5-6, it is assumed that PE1, PE2, PE3 and PE4 belong to the same EVPN instance and the first PE device corresponds to PE1. Then, the remaining PE devices correspond to PE2, PE3 and PE4.

At step 204, the controlling device performs route reflection from the remaining PE devices to the first PE device such that the first PE device knows that BUM traffic needs to be forwarded to the first P device. The controlling device may act as a BGP route reflector to perform the route reflection.

Figure 3:
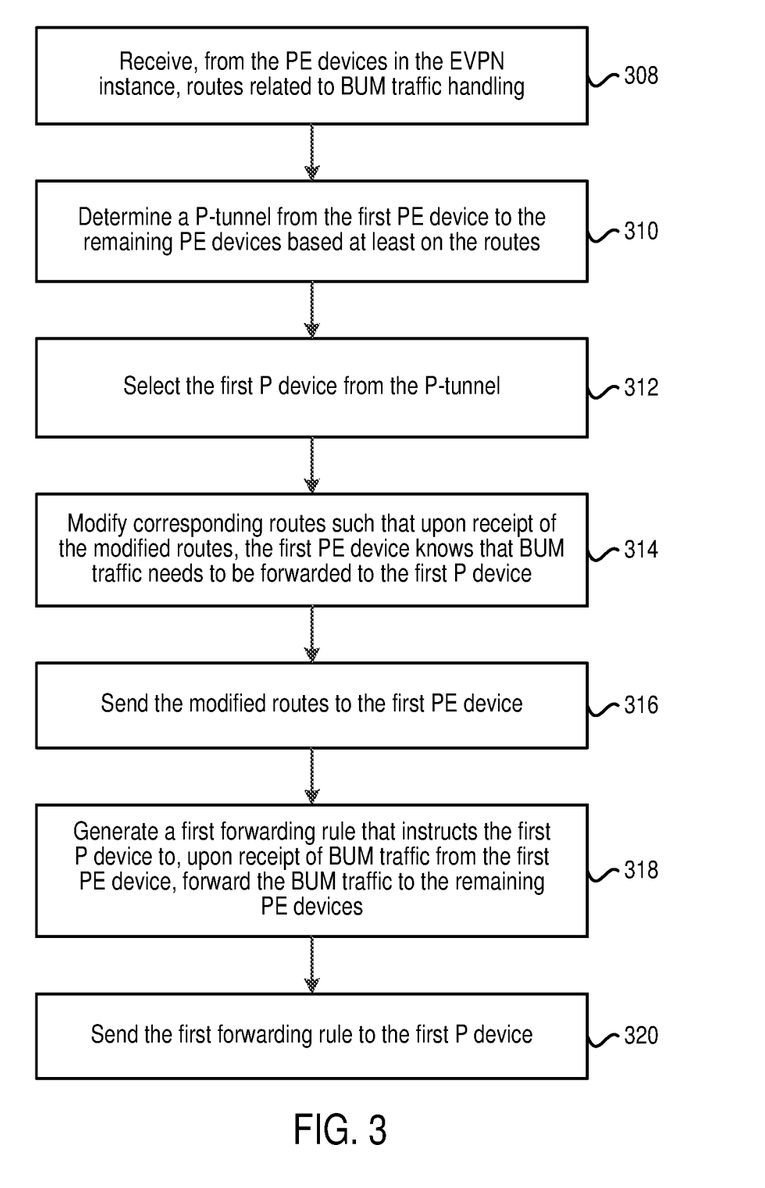
FIG. 3 is a flowchart for explaining the method of FIG. 2.

For example, step 202 may be implemented as steps 310-312 of FIG. 3. Step 204 may be implemented as steps 308, 314 and 316 of FIG. 3. Specifically, at step 308, routes related to BUM traffic handling are received from the PE devices in the EVPN instance, as shown in FIG. 5. The route from a PE device may be, for example, an Inclusive Multicast Ethernet Tag Route which includes MPLS Label field in PMSI Tunnel Attribute, Originating Router's IP Address field and Next Hop field, as defined in RFC 7432 and related protocols. The MPLS Label field is allocated by the PE device.

At step 310, a provider tunnel (P-tunnel) from the first PE device to the remaining PE devices is determined based at least on the received routes related to BUM traffic handling. Specifically, by using these routes, a tree having the first PE device as the root and the remaining PE devices as the leaves may be determined as the P-tunnel.

Optionally, for optimization of the determined tree, the determination may be based on the transport topology among the PE devices in the EVPN instance. Further, optionally, the determination may be based on traffic engineering policy/status. For example, if the use of a portion of the determined tree should be avoided according to the traffic engineering policy/status, this portion may be removed from the determined tree. Thus, P-tunnel planning is not limited to or fixed to specific multicast protocols and thus can be more flexible.

At step 312, the first P device is selected from the P-tunnel. For example, a P device located at the downstream of the first PE device and the upstream of the remaining PE devices (e.g., at the first branch in the downstream direction of the first PE device) may be selected from the determined tree as the first P device. In the example shown in FIGS. 5-6, it is assumed that the first P device corresponds to P1.

At step 314, the routes from the remaining PE devices are modified such that upon receipt of the modified routes, the first PE device knows that BUM traffic needs to be forwarded to the first P device. In the example of the Inclusive Multicast Ethernet Tag Route, step 314 may be implemented as steps 422-426 or steps 422-430 of FIG. 4, depending on the types of the EVPN and the P-tunnel between the first PE and P devices. Specifically, when the P-tunnel between the first PE and P devices is implemented through P2MP tunnels, since the ESI label is upstream assigned, steps 428-430 are not needed.

Figure 4:
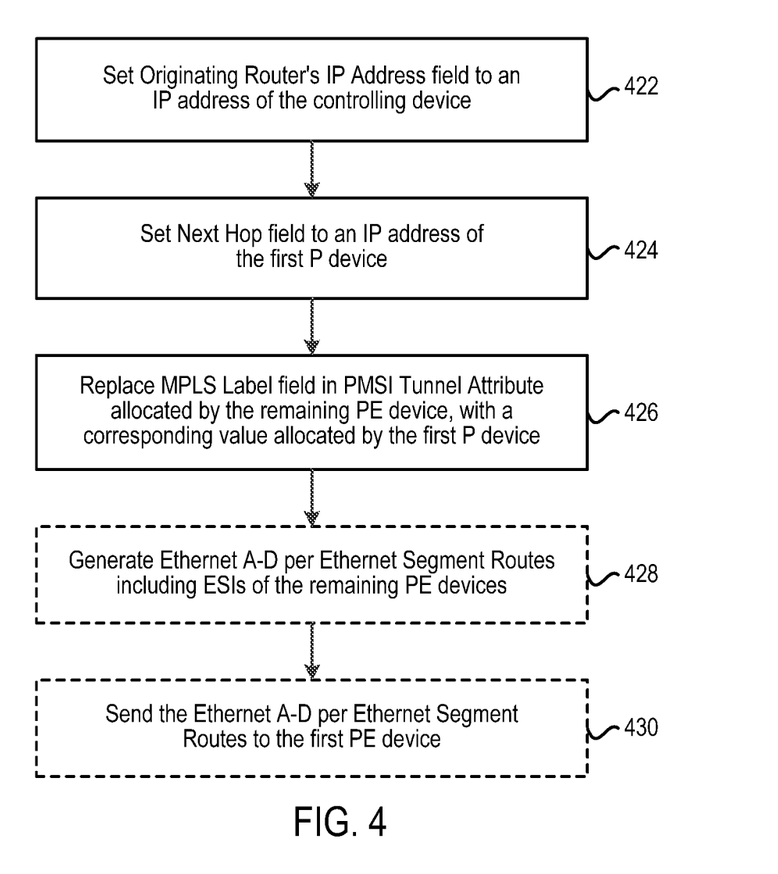
FIG. 4 is a flowchart for explaining the method of FIG. 2.

When the P-tunnel between the first PE and P devices is implemented through ingress replication, for example, when it is a multipoint to point (MP2P)/point to point (P2P) tunnel, the implementation of step 314 depends on the type of the EVPN. If the EVPN is an MPLS-based VPN defined in RFC7432, such as MPLS over generic routing encapsulation (MPLSoGRE), steps 428-430 are needed. If the EVPN is a provider backbone bridging (PBB)-based VPN defined in RFC7623, or a virtual extensible LAN (VXLAN)/ network virtualization using generic routing encapsulation (NVGRE) based VPN defined in draft-ietf-bess-evpn-overlay-10, steps 428-430 are not needed.

At step 422, the Originating Router's IP Address field is set to an IP address of the controlling device, as shown in FIG. 5. This can inform the first PE device that this route comes from the controlling device which acts as a route reflector. At step 424, the Next Hop field is set to an IP address of the first P device, as shown in FIG. 5. This can inform the first PE device that it has a neighbor, i.e. the first P device. At step 426, the MPLS Label field in PMSI Tunnel Attribute allocated by the remaining PE device is replaced with a corresponding value allocated by the first P device, as shown in FIG. 5. This MPLS label may also be referred to as VPN label herein. This modification can inform the first PE device that its neighbor has the indicated VPN label. In this way, all the routes from the remaining PE devices can be modified to inform the first PE device of the same information that it has a neighbor, i.e. the first P device.

As described above, if the P-tunnel between the first PE and P devices is implemented through ingress replication and the EVPN is an MPLS-based VPN, steps 428-430 are needed. At step 428, the controlling device generates Ethernet A-D per Ethernet Segment Routes including ESIs of the remaining PE devices. Specifically, when the controlling device receives an Ethernet A-D per Ethernet Segment Route from each remaining PE device, in addition to reflecting this Ethernet A-D per Ethernet Segment Route without changes, the controlling device also generates a corresponding Ethernet A-D per Ethernet Segment Route including the ESI(s) of the remaining PE device. The Ethernet A-D per Ethernet Segment Route may be generated according to RFC 7432 and related protocols.

At step 430, the controlling device sends the generated Ethernet A-D per Ethernet Segment Routes to the first PE device. As a result, from the viewpoint of the first PE device, all the ESIs of the remaining PE devices are attached to the first P device. For example, as shown in FIG. 5, the ESIs (A, B, C, D) of the remaining PE devices (PE2, PE3 and PE4) are all attached to P1. It should be noted that if the P-tunnel between the first PE and P devices is implemented through ingress replication and the EVPN is a PBB-EVPN, VXLAN or NVGRE based VPN, the same effect can be achieved without steps 428-430.

At step 316, the modified routes are sent to the first PE device, as shown in FIG. 5. As described above, all the routes from the remaining PE devices can be modified to inform the first PE device of the same information that it has a neighbor, i.e. the first P device. Thus, from the viewpoint of the first PE device, the P-tunnel is only from the first PE device to the first P device. This P-tunnel may be implemented through ingress replication or P2MP tunnels.

In the case of ingress replication, the P-tunnel (MP2P/P2P tunnel) may be created through various techniques such as LDP, Segment Routing and so on. Note that if an MP2P/P2P tunnel has been established between the first PE and P devices, the MP2P/P2P tunnel may be used directly without the creating process. Assume that the ESI-label and the VPN label assigned by the first P device to the first PE device are ESI-A and VPN1 respectively, and the label switched path (LSP) label assigned to the first PE device is LSP1. Then, when a BUM packet needs to be forwarded, the payload of the packet may be encapsulated as shown in FIG. 6. The encapsulated packet may be sent to the first P device via the MP2P/P2P tunnel.

In the case of P2MP tunnels, the P2MP tunnel may be created through various techniques such as RSVP-TE, mLDP and so on. Then, when a BUM packet needs to be forwarded, the payload of the packet may be encapsulated. The encapsulation may be similar to the case of ingress replication except that the ESI label and the VPN label are upstream assigned from the first PE device to the first P device. The encapsulated packet may be sent to the first P device via the P2MP tunnel.

Referring back to FIG. 2, at step 206, the controlling device configures the first P device such that upon receipt of BUM traffic from the first PE device, the first P device can forward the BUM traffic to the remaining PE devices. In this way, the first P device can act as a replication point for the first PE device. For example, step 206 may be implemented as steps 318-320 of FIG. 3.

At step 318, the controlling device generates a first forwarding rule that instructs the first P device to, upon receipt of BUM traffic from the first PE device, forward BUM traffic to the remaining PE devices. For explaining the first forwarding rule, take FIG. 6 as an example. Assume that an MP2P/P2P tunnel has been established between P1 and each of PE2, PE3 and PE4. Specifically, for the MP2P/P2P tunnel between P1 and PE2, the VPN label and the LSP label are VPN2 and LSP2 respectively. For the MP2P/P2P tunnel between P1 and PE3, the VPN label and the LSP label are VPN3 and LSP3 respectively. For the MP2P/P2P tunnel between P1 and PE4, the VPN label and the LSP label are VPN4 and LSP4 respectively. Furthermore, assume that the controlling device configures the PE devices such that they assign a same ESI label for a same ESI, as shown at block 642. This may be done through various southbound protocols such as NETCONF protocol. Thus, the same ESI label, ESI-A is assigned to P1 from PE2, PE3 and PE4.

Then, once a BUM packet is received on P1, the LSP1 will be popped as the tunnel is terminated. Thus, the label VPN1 appears as the topmost label in the packet. When MPLS based forwarding behavior is employed, the first forwarding rule may be expressed as:

replicate the packet (in label VPN1) out, swap VPN2 and push LSP2;

replicate the packet (in label VPN1) out, swap VPN3 and push LSP3;

replicate the packet (in label VPN1) out, swap VPN4 and push LSP4.

As shown above, to support split horizon mechanism defined in RFC 7432 and related protocols, when performing the forwarding, the first P device may always encapsulate the ESI label of the first PE device into the packet forwarded out, no matter the ESI is attached to the first P device or not. It should be noted that the same ESI label (ESI-A) is merely an optional configuration for the purpose of simplifying the forwarding behavior. Optionally, for the same purpose, the controlling device may configure the PE devices such that they assign a same MPLS Label field in PMSI Tunnel Attribute for a same EVPN instance, as shown at block 640. This may also be done through various southbound protocols such as NETCONF protocol. For the case of P2MP tunnels, the first forwarding rule may be generated similarly except that the ESI label and the VPN label are upstream assigned.

At step 320, the first forwarding rule is sent to the first P device, as shown in FIG. 6. The first forwarding rule may be sent through various southbound protocols such as network configuration (NETCONF) protocol. As a result, when the first P device receives a BUM packet from the first PE device, the first P device can forward the BUM packet to the remaining PE devices according to the first forwarding rule. This forwarding may be implemented through MP2P/P2P tunnels and/or P2MP tunnels. If the tunnels are not available, they may be created as described above.

In summary, in the solution shown in FIG. 2, a controlling device (e.g., an SDN controller) is introduced to EVPN deployments. Under the help of the controlling device, each PE device considers that the P-tunnel is just between one P node and itself. The P node is on behalf of other PE devices in the same EVPN instance. As a result, flexible traffic replication happening inside the network fabric can be accommodated, without functional changes on existing PE devices. Since all controls are located on the controlling device, simple operations and low cost maintaining can be achieved.

Figure 7:
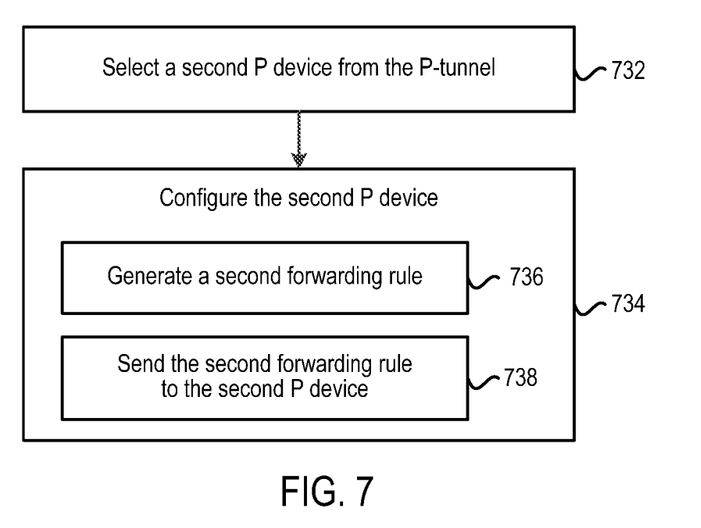
FIG. 7 is a flowchart illustrating a method implemented at a controlling device according to another embodiment of the disclosure.

FIG. 7 is a flowchart illustrating a method implemented at a controlling device according to another embodiment of the disclosure. At step 732, the controlling device selects a second P device from the P-tunnel. The P-tunnel may be determined in step 310. For example, a P device located at the downstream of the first P device and the upstream of one or more of the remaining PE devices may be selected from the determined tree as the second P device.

At step 734, the controlling device configures the second P device such that upon receipt of BUM traffic from the first P device, the second P device can forward the BUM traffic to the one or more of the remaining PE devices. For example, step 734 may be implemented as steps 736-738. At step 736, the controlling device determines a second forwarding rule that instructs the second P device to, upon receipt of BUM traffic from the first P device, forward the BUM traffic to the one or more of the remaining PE devices. At step 738, the second forwarding rule is sent to the second P device. Steps 736-738 may be similar to steps 318-320 and thus their detailed description is omitted here. Due to the introduction of the second P device, the P-tunnel planning can be more flexible.

Figure 8:
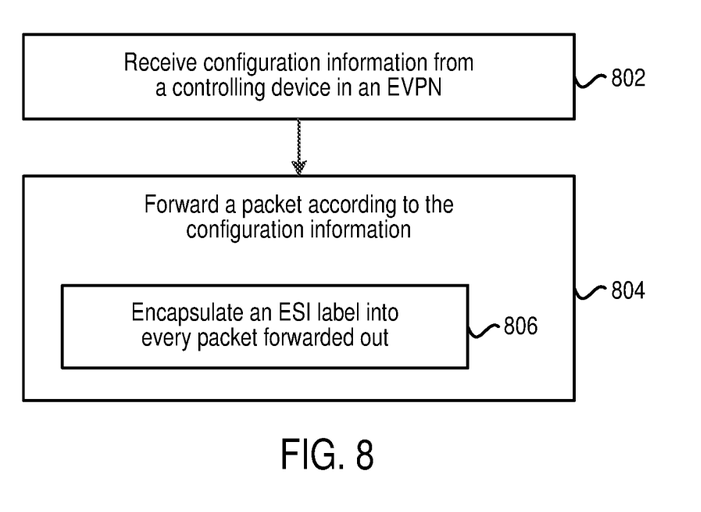
FIG. 8 is a flowchart illustrating a method implemented at a provider device according to an embodiment of the disclosure.

FIG. 8 is a flowchart illustrating a method implemented at a provider device according to an embodiment of the disclosure. At step 802, the P device receives configuration information from a controlling device in the EVPN. The configuration information instructs the P device to, upon receipt of BUM traffic from a first PE device in an EVPN instance, forward the BUM traffic to one or more of remaining PE devices in the same EVPN instance. The configuration information may be, for example, a forwarding rule which may be implemented as described above with respect to step 318.

At step 804, upon receipt of a packet of BUM traffic from the first PE device, the P device forwards the packet according to the configuration information. As described above, step 804 may include step 806 in which an ESI label is encapsulated into every packet forwarded out. The forwarding of the BUM packet has been described above and thus its details are omitted here.

It should be noted that the P device described with reference to FIG. 8 covers the first P device and the second P device described with reference to FIGS. 2 and 7, since the expressions "receive from" and "forward to" may refer to direct and/or indirect communication(s). Specifically, the first P device receives the BUM traffic directly from the first PE device, and forwards the BUM traffic to the remaining PE devices directly or indirectly via additional P device(s). The second P device receives the BUM traffic from the first PE device indirectly via the first P device, and forwards the BUM traffic to one or more of the remaining PE devices directly or indirectly via additional P device(s). It should also be noted that in the figures described above, two steps shown in succession may, in fact, be executed substantially concurrently, or the steps may sometimes be executed in the reverse order, depending upon the functionality involved.

Figure 9:
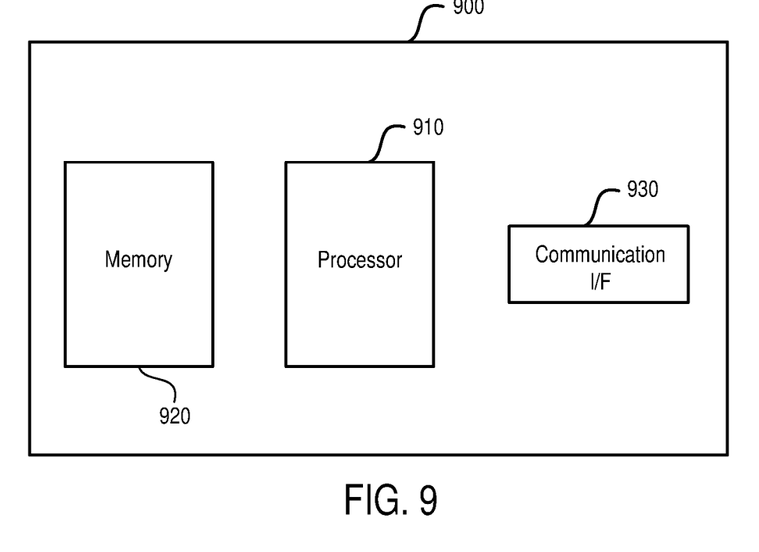
FIG. 9 is a block diagram showing an apparatus suitable for use in practicing some embodiments of the disclosure.

FIG. 9 is a block diagram showing an apparatus suitable for use in practicing some embodiments of the disclosure. For example, any one of the controlling device and the P device described above may be implemented through the apparatus 900. As shown, the apparatus 900 may include a processor 910, a memory 920 that stores a program, and a communication interface 930 for communicating data with other external devices through wired and/or wireless communication.

The program includes program instructions that, when executed by the processor 910, enable the apparatus 900 to operate in accordance with the embodiments of the present disclosure, as discussed above. That is, the embodiments of the present disclosure may be implemented at least in part by computer software executable by the processor 910, or by hardware, or by a combination of software and hardware.

The memory 920 may be of any type suitable to the local technical environment and may be implemented using any suitable data storage technology, such as semiconductor based memory devices, flash memory, magnetic memory devices and systems, optical memory devices and systems, fixed memory and removable memory. The processor 910 may be of any type suitable to the local technical environment, and may include one or more of general purpose computers, special purpose computers, microprocessors, digital signal processors (DSPs) and processors based on multi-core processor architectures, as non-limiting examples.

Figure 10:
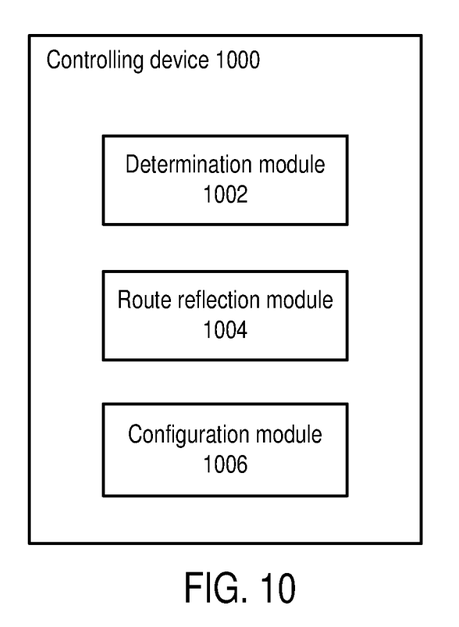
FIG. 10 is a block diagram showing a controlling device according to another embodiment of the disclosure.

FIG. 10 is a block diagram showing a controlling device according to another embodiment of the disclosure. As shown, the controlling device 1000 comprises a determination module 1002, a route reflection module 1004 and a configuration module 1006. The determination module 1002 is configured to determine a first P device which is to handle BUM traffic from a first PE device in an EVPN instance, on behalf of remaining PE devices in the same EVPN instance. The route reflection module 1004 is configured to perform route reflection from the remaining PE devices to the first PE device such that the first PE device knows that BUM traffic needs to be forwarded to the first P device. The configuration module 1006 is configured to configure the first P device such that upon receipt of BUM traffic from the first PE device, the first P device can forward the BUM traffic to the remaining PE devices.

For example, the determination module 1002 may be configured to perform steps 310-312 of FIG. 3 and optionally step 732 of FIG. 7. The route reflection module 1004 may be configured to perform steps 308, 314 and 316 of FIG. 3. The configuration module 1006 may be configured to perform steps 318-320 of FIG. 3 and optionally step 734 of FIG. 7.

Similar to the controlling device, as another embodiment, the P device may comprise a reception module and a forwarding module. The reception module is configured to receive configuration information from a controlling device in the EVPN. The configuration information instructs the P device to, upon receipt of BUM traffic from a first PE device in an EVPN instance, forward the BUM traffic to one or more of remaining PE devices in the same EVPN instance. The forwarding module is configured to, upon receipt of a packet of BUM traffic from the first PE device, forward the packet according to the configuration information. For example, the forwarding module may be configured to perform step 806 of FIG. 8.

Figure 11:
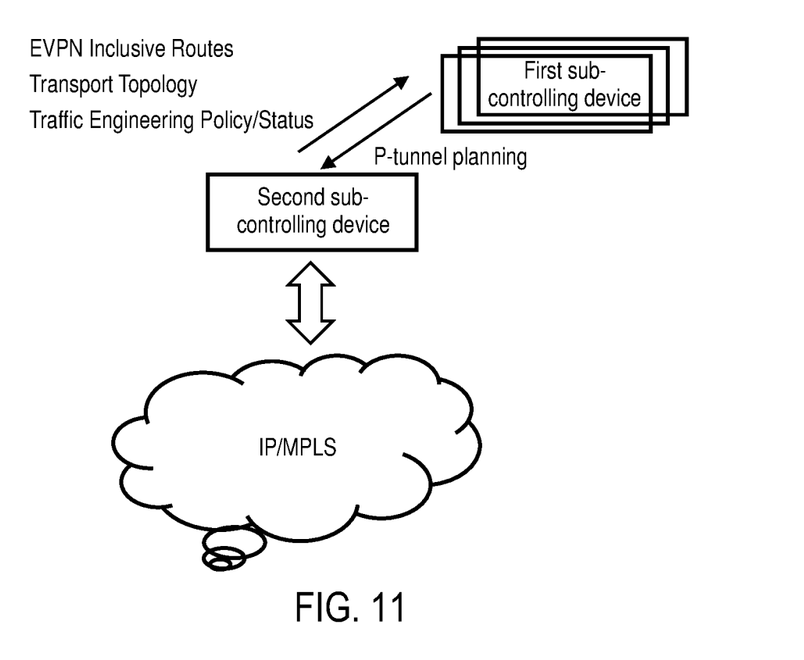
FIG. 11 is a block diagram showing a controlling device according to another embodiment of the disclosure.

FIG. 11 is a block diagram showing a controlling device according to another embodiment of the disclosure. As shown, the controlling device described above may be distributed on a first sub-controlling device and a second sub-controlling device. The first sub-controlling device is configured to determine the first P device as described above. The second sub-controlling device is configured to perform the route reflection and configure the first P device as described above. The first sub-controlling device may be the determination module 1002 described above. It may be run at server node(s). Optionally, considering load balancing, the determination module 1002 may also be implemented as several instances, each of which serves for one or more EVPN instances. The second sub-controlling device may be an SDN controller including the route reflection module 1004 and the configuration module 1006.

As still another embodiment, for example, when the EVPN spans across multiple areas, the controlling device described above may be distributed on a plurality of sub-controlling devices each of which is connected to part of the PE devices in the EVPN instance. The plurality of sub-controlling devices may be configured to work together for the PE devices in the EVPN instance. The EVPN routes may be exchanged among these sub-controlling devices through BGP.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a controlling device in an Ethernet virtual private network (EVPN), the method comprising:
   determining a first provider (P) device to handle broadcast, unknown unicast or multicast (BUM) traffic from a first provider edge (PE) device in an EVPN instance, on behalf of remaining PE devices in the same EVPN instance;
   performing route reflection from the remaining PE devices to the first PE device such that the first PE device knows that BUM traffic needs to be forwarded to the first P device; and
   configuring the first P device such that upon receipt of BUM traffic from the first PE device, the first P device can forward the BUM traffic to the remaining PE devices,
   the controlling device being distributed on a first sub-controlling device and a second sub-controlling device, the first sub-controlling device being configured to determine the first P device, and the second sub-controlling device being configured to perform the route reflection and configure the first P device.

2. The method according to claim 1, wherein determining the first P device comprises:
   determining a provider tunnel (P-tunnel) from the first PE device to the remaining PE devices based at least on routes related to BUM traffic handling from the PE devices in the EVPN instance; and
   selecting the first P device from the P-tunnel.

3. The method according to claim 2, wherein the P-tunnel is determined based further on at least one of:
   transport topology among the PE devices in the EVPN instance;
   traffic engineering policy; and
   traffic engineering status.

4. The method according to claim 1, wherein performing the route reflection comprises:
   receiving, from the PE devices in the EVPN instance, routes related to BUM traffic handling;
   modifying the routes from the remaining PE devices such that upon receipt of the modified routes, the first PE device knows that BUM traffic needs to be forwarded to the first P device; and
   sending the modified routes to the first PE device.

5. The method according to claim 4, wherein:
   the route from each remaining PE device is an Inclusive Multicast Ethernet Tag Route; and
   for each remaining PE device, modifying the route comprises:
      setting an Originating Router's IP Address field, associated with the route, to an IP address of the controlling device;
      setting a Next Hop field, associated with the route, to an IP address of the first P device; and
      replacing an MPLS Label field in PMSI Tunnel Attribute allocated by the remaining PE device, with a corresponding value allocated by the first P device.

6. The method according to claim 4, wherein:
   the P-tunnel between the first PE device and the first P device is implemented through ingress replication;
   the EVPN is an MPLS-based VPN; and
   the method further comprises:
      generating Ethernet A-D per Ethernet Segment Routes including Ethernet segment identifiers (ESIs) of the remaining PE devices; and
      sending the Ethernet A-D per Ethernet Segment Routes to the first PE device.

7. The method according to claim 5, further comprising at least one of the following:
   configuring MPLS Label field in PMSI Tunnel Attributes for all the remaining PE devices with a same EVPN instance; and
   configuring a same ESI label for ESI fields associated with routes for all the remaining PE devices.

8. The method according to claim 1, wherein configuring the first P device comprises:
   generating a first forwarding rule that instructs the first P device to, upon receipt of BUM traffic from the first PE device, forward the BUM traffic to the remaining PE devices; and
   sending the first forwarding rule to the first P device.

9. The method according to claim 2, further comprising:
   selecting a second P device from the P-tunnel; and
   configuring the second P device such that upon receipt of BUM traffic from the first P device, the second P device can forward the BUM traffic to one or more of the remaining PE devices.

10. The method according to claim 9, wherein configuring the second P device comprises:
    generating a second forwarding rule that instructs the second P device to, upon receipt of BUM traffic from the first P device, forward the BUM traffic to the one or more of the remaining PE devices; and
    sending the second forwarding rule to the second P device.

11. The method according to claim 1, wherein:
    the controlling device is distributed on a plurality of sub-controlling devices each of which is connected to a portion of the PE devices in the EVPN instance; and
    the plurality of sub-controlling devices are configured to work together for the PE devices in the EVPN instance.

12. A method implemented at a provider (P) device in an Ethernet virtual private network (EVPN), the method comprising:
    receiving configuration information from a controlling device in the EVPN, the configuration information instructs the P device to, upon receipt of broadcast, unknown unicast or multicast (BUM) traffic from a first provider edge (PE) device in an EVPN instance, forward the BUM traffic to one or more of remaining PE devices in the same EVPN instance; and
    upon receipt of a packet of BUM traffic from the first PE device, forwarding the packet according to the configuration information,
    the controlling device being distributed on a first sub-controlling device and a second sub-controlling device, the first sub-controlling device being configured to determine the P device, and the second sub-controlling device being configured to perform route reflection from the remaining PE devices to the first PE device such that the first PE device knows that BUM traffic needs to be forwarded to the first P device, P device being configured by the second sub-controlling device.

13. The method according to claim 12, wherein forwarding the packet according to the configuration information comprises encapsulating an Ethernet segment identifier (ESI) label into every packet forwarded out.

14. A controlling device in an Ethernet virtual private network (EVPN), the controlling device comprising:
a processor; and
a memory containing computer-executable instructions that, when executed by the processor, configure the controlling device to:
determine a first provider (P) device to handle broadcast, unknown unicast or multicast (BUM) traffic from a first provider edge (PE) device in an EVPN instance, on behalf of remaining PE devices in the same EVPN instance;
perform route reflection from the remaining PE devices to the first PE device such that the first PE device knows that BUM traffic needs to be forwarded to the first P device; and
configure the first P device such that upon receipt of BUM traffic from the first PE device, the first P device can forward the BUM traffic to the remaining PE devices,
the controlling device being distributed on a first sub-controlling device and a second sub-controlling device, the first sub-controlling device being configured to determine the first P device, and the second sub-controlling device being configured to perform the route reflection and configure the first P device.

15. The controlling device according to claim 14, wherein the controlling device is operative to determine the first P device by:
determining a provider tunnel (P-tunnel) from the first PE device to the remaining PE devices based at least on routes related to BUM traffic handling from the PE devices in the EVPN instance; and
selecting the first P device from the P-tunnel.

16. The controlling device according to claim 15, wherein the controlling device is operative to determine the P-tunnel based further on at least one of:

transport topology among the PE devices in the EVPN instance;
traffic engineering policy; and
traffic engineering status.

17. The controlling device according to claim 14, wherein the controlling device is operative to perform the route reflection by:
receiving, from the PE devices in the EVPN instance, routes related to BUM traffic handling;
modifying the routes from the remaining PE devices such that upon receipt of the modified routes, the first PE device knows that BUM traffic needs to be forwarded to the first P device; and
sending the modified routes to the first PE device.

18. The controlling device according to claim 17, wherein:
the route from a remaining PE device is an Inclusive Multicast Ethernet Tag Route; and
execution of the instructions configures the controlling device to modify the route by:
setting an Originating Router's IP Address field, associated with the route, to an IP address of the controlling device;
setting a Next Hop field, associated with the route, to an IP address of the first P device; and
replacing an MPLS Label field in PMSI Tunnel Attribute allocated by the remaining PE device, with a corresponding value allocated by the first P device.

19. The controlling device according to claim 17, wherein:
the P-tunnel between the first PE device and the first P device is implemented through ingress replication;
the EVPN is an MPLS-based VPN; and
execution of the instructions further configures the controlling device to:
generate Ethernet A-D per Ethernet Segment Routes including Ethernet segment identifiers (ESIs) of the remaining PE devices; and
send the Ethernet A-D per Ethernet Segment Routes to the first PE device.

* * * * *